US010543934B2

(12) United States Patent
Moes et al.

(10) Patent No.: US 10,543,934 B2
(45) Date of Patent: Jan. 28, 2020

(54) GROUND SUPPORT SYSTEM FOR AN AIRCRAFT HAVING A TURBINE ENGINE

(71) Applicant: Duinmaaijer B.V., Weesp (NL)

(72) Inventors: Pieter Jacob Moes, Amsterdam (NL); Jan Willem Lammers, Almere (NL); Robert Raymond Hettema, Almere (NL)

(73) Assignee: DUINMAAIJER B.V., Weesp (NL)

( * ) Notice: Subject to any disclaimer, the term of this patent is extended or adjusted under 35 U.S.C. 154(b) by 448 days.

(21) Appl. No.: 15/103,771

(22) PCT Filed: Dec. 10, 2014

(86) PCT No.: PCT/NL2014/050845
§ 371 (c)(1),
(2) Date: Jun. 10, 2016

(87) PCT Pub. No.: WO2015/088338
PCT Pub. Date: Jun. 18, 2015

(65) Prior Publication Data
US 2016/0325850 A1 Nov. 10, 2016

(30) Foreign Application Priority Data

Dec. 10, 2013 (NL) ...................................... 2011931

(51) Int. Cl.
*B64F 1/34* (2006.01)
*F04D 25/04* (2006.01)
(Continued)

(52) U.S. Cl.
CPC ................ *B64F 1/34* (2013.01); *B64F 1/364* (2013.01); *B64F 5/60* (2017.01); *F04D 25/04* (2013.01); *F02B 63/04* (2013.01); *F02B 63/06* (2013.01)

(58) Field of Classification Search
CPC .. F02C 7/27; F02C 7/277; F02B 63/04; F02B 63/048; F02B 63/06; B64F 1/34;
(Continued)

(56) References Cited

U.S. PATENT DOCUMENTS

| 5,993,163 A * | 11/1999 | Iden ...................... F04C 11/006 |
| | | 417/18 |
| 6,424,891 B1 | 7/2002 | Sargent et al. |

(Continued)

FOREIGN PATENT DOCUMENTS

| DE | 3409378 A1 | 3/1985 |
| EP | 1655222 A1 | 5/2006 |

(Continued)

OTHER PUBLICATIONS

WO 85/04149 provided with Machine Translation, 15103771,Foreign_Reference,Jun. 10, 2016_Machtrans.*

*Primary Examiner* — Kenneth J Hansen
(74) *Attorney, Agent, or Firm* — Browdy and Neimark, P.L.L.C.

(57) ABSTRACT

A ground support system (1) for an aircraft having a turbine engine, which ground support system comprises; an intermittent combustion engine (2), a generator (3) which is driven by the combustion engine to supply electrical power with a constant frequency, an electricity cable (4) to transport the electrical power to the aircraft, an air pump (5) which is driven by the combustion engine to supply pressurised air, an air duct (6) to transport the pressurised air to the aircraft, a control unit (7) to control the operation of the ground support system (1), which control unit (7) communicates with the combustion engine (2) to let the combustion engine run at a predetermined engine rotational speed, and wherein the air pump (5) is driven by the combustion engine (2) via an adjustable transmission (16) to adjust an air flow rate of the pressurised air supplied by the air pump (5), while (Continued)

the combustion engine (2) remains running at the predetermined engine rotational speed.

20 Claims, 2 Drawing Sheets

(51) Int. Cl.
*B64F 5/60* (2017.01)
*B64F 1/36* (2017.01)
*F02B 63/04* (2006.01)
*F02B 63/06* (2006.01)

(58) Field of Classification Search
CPC .... B64F 1/364; B64F 5/60; B64F 3/02; F02N 7/00; F02N 9/04; F04B 49/20
USPC .................. 60/787; 417/234, 212, 364, 380
See application file for complete search history.

(56) References Cited

U.S. PATENT DOCUMENTS

| | | |
|---|---|---|
| 2003/0164256 A1 | 9/2003 | Murray et al. |
| 2011/0187123 A1* | 8/2011 | Hamm .................. B65D 47/02 290/1 A |

FOREIGN PATENT DOCUMENTS

| | | | |
|---|---|---|---|
| WO | 8504149 A1 | 9/1985 | |
| WO | WO 2007061622 A1 * | 5/2007 | ................ B64F 1/34 |

* cited by examiner

GROUND SUPPORT SYSTEM FOR AN AIRCRAFT HAVING A TURBINE ENGINE

FIELD OF THE INVENTION

The invention relates to a ground support system for an aircraft (such as an airplane or helicopter) having a turbine engine.

BACKGROUND OF THE INVENTION

The known ground support systems comprise a intermittent combustion engine, a generator to supply electrical power, and an air pump to supply pressurised air. The intermittent combustion engine is an internal combustion engine and is sometimes also referred to as a reciprocating combustion engine. In general a diesel four stroke engine is used, but also other intermittent combustion engines may be used. The generator and air pump are operatively coupled to the combustion engine. In use, the combustion engine runs at a predetermined rotational speed. This is required because the electrical power supplied by the generator needs to have a constant frequency. As a result of this, the pressurised air supplied by the air pump has a constant air flow rate. The pressurised air is used to test the aircraft, more specifically the equipment of the aircraft. The air pump continuously produces its maximum air flow rate. If at a certain moment a lower air flow rate is required, the pressurised air supplied by the air pump is partly discharged. This also means that the combustion engine continuously operates at its maximum. The invention is based on the insight that there is a need in the field of the art that a ground support system can provide multiple tasks.

SUMMARY OF THE INVENTION

The invention has the objective to provide an improved or alternative ground support system, which ground support system comprises; an intermittent combustion engine, a generator which is driven by the combustion engine to supply electrical power with a constant frequency, an electricity cable to transport the electrical power to the aircraft, an air pump which is driven by the combustion engine to supply pressurised air, an air duct to transport the pressurised air to the aircraft, a control unit to control the operation of the ground support system, which control unit communicates with the combustion engine to let the combustion engine run at a predetermined engine rotational speed, and wherein the air pump is driven by the combustion engine via an adjustable transmission to adjust an air flow rate of the pressurised air supplied by the air pump, while the combustion engine remains running at the predetermined engine rotational speed.

The transmission allows that the air flow rate of the pressurised air produced by the air pump can be adjusted, while the combustion engine remains running at the predetermined engine rotational speed. It is required that the combustion engine remains running at the predetermined engine rotational speed, because the generator needs to supply electrical power with a constant frequency. If the engine rotational speed would be changed, the frequency of the supplied electrical power would change. The fact that the air flow rate of the pressurised air is adjustable without changing the engine rotational speed of the combustion engine, allows that the operation of the air pump can be adjusted to perform different tasks. In addition to this, the air pump is not continuously operating at its maximum, due to which the air pump will have a longer life time. The pressurised air provided by the ground support system can be optimally matched with the requirements of the aircraft. Furthermore, due to the fact that the air pump will not continuously operate at its maximum, the combustion engine will not continuously operate at its maximum. The combustion engine will therefore have a longer life time and the ground support system will use less fuel.

The fact that the operation of the air pump can be adjusted, allows that the air pump can be used for additional tasks besides the supporting of the aircraft during testing, such as an air-start of the turbine engine of the aircraft. The turbine engine of the aircraft can be started with the use of a supply of pressurised air. This is often referred to as an air-start. A higher air flow rate and air overpressure is required for an air-start, when compared with the air flow rate and air overpressure needed during the testing of the equipment of the aircraft.

In an embodiment of the ground support system according the invention, the adjustable transmission is continuously variable. This means that the transmission is not adjustable in steps, but can be adjusted continuously. Hence, the operation of the air pump can be continuously varied.

In an embodiment of the ground support system according the invention, the air pump and transmission are configured to adjust the air flow rate of the pressurised air over a range of 0-13 $m^3$/min, while an maximum producible air overpressure of the pressurised air is at least 2.2 bar. In use, the air flow rate is set with the control unit. The in this document indicated air flow rates are determined at a temperature of around 20° C. The air overpressure that is reached, depends on the resistance of the aircraft. If the resistance of the aircraft is low, a relatively low air overpressure will be reached. If the resistance of the aircraft is high, a relatively high air overpressure will be reached. The maximum producible air overpressure indicates the highest air overpressure that the air pump can produce.

In an embodiment of the ground support system according the invention, the air pump and transmission are configured to adjust the air flow rate of the pressurised air over a range of 0-23 $m^3$/min, while an maximum producible air overpressure of the pressurised air is at least 3 bar.

In an embodiment of the ground support system according the invention, the control unit is configured to switch the air pump from a first operation mode, in which the pressurised air is supplied with a first air flow rate, into a second operation mode, in which the pressurised air is supplied with a second air flow rate, and vice versa, and wherein the second air flow rate is higher than the first air flow rate.

In an embodiment of the ground support system according the invention, the first flow rate is set to support the aircraft during testing, and the second flow rate is set to perform an air-start of the turbine engine.

In an embodiment of the ground support system according the invention, in the first operation mode, the air flow rate of the pressurised air is lower than 8 $m^3$/min, while a maximum producible air overpressure of the pressurised air is lower than 2.1 bar, or equal to 2.1 bar, and in the second operation mode, the air flow rate of the pressurised air is between 13-23 $m^3$/min, while a maximum producible air overpressure of the pressurised air is between 2.2-3.5 bar.

In an embodiment of the ground support system according the invention;
  the adjustable transmission comprises a liquid pump
    which is operatively coupled to the combustion engine
    and a hydraulic driver which is operatively coupled to
    the air pump, the liquid pump is hydraulically connected to the hydraulic driver via a liquid channel to drive the hydraulic driver, and the control unit communicates with the liquid pump to adjust a liquid flow rate of the liquid pumped by the liquid pump in order to adjust a driving rotational speed with which the hydraulic driver drives the air pump.

In an embodiment of the ground support system according the invention;

the air pump is pneumatically connected to the air duct via an air channel, and a flow rate unit is connected to the air pump or the air channel to determine the air flow rate of pressurised air through the air channel.

In an embodiment of the ground support system according the invention, the flow rate unit is connected to the air pump and determines a pneumatic rotational speed at which the air pump operates.

In an embodiment of the ground support system according the invention;

a first discharge channel is pneumatically connected to the air channel, a first controllable air valve is provided in the first discharge channel, and the control unit communicates with the flow rate unit and the first controllable air valve to open the first controllable air valve when the air flow rate of pressurised air through the air channel is lower than a predetermined air flow rate. If the air flow rate is too low, the temperature of the air will rise. In order to avoid that the air pump will be over heated, the first controllable air valve will be opened. This way, pressurised air will be discharged, so that the air flow rate will rise until the predetermined air flow rate is reached.

In an embodiment of the ground support system according the invention, the control unit opens the second controllable air valve when the air flow rate is lower than 2 m³/min.

In an embodiment of the ground support system according the invention, the control unit opens the second controllable air valve when the air flow rate is lower than 2000 rounds per minute.

In an embodiment of the ground support system according the invention, an air pressure sensor connected to the air pump or the air channel.

In an embodiment of the ground support system according the invention;

a second discharge channel is pneumatically connected to the air channel, a second controllable air valve is provided in the second discharge channel, and the control unit communicates with the air pressure sensor and the second controllable air valve to open the second controllable air valve when the overpressure of the pressurised air in the air channel increases more than a predetermined amount of bar/sec.

In an embodiment of the ground support system according the invention, the control unit opens the second controllable air valve when the air overpressure increases more than 1 bar/sec.

In an embodiment of the ground support system according the invention;

the first controllable air valve and the second controllable air valve are combined in a single controllable air valve, and the first discharge channel and the second discharge channel are combined in a single discharge channel.

In an embodiment of the ground support system according the invention, the generator supplies electrical power with a constant frequency due to the combustion engine running at the predetermined engine rotational speed.

It will be clear that the ground support system according to the invention can comprise the features of any combination of the above mentioned embodiments of the ground support system.

The invention further relates to a method for supporting an aircraft with a turbine engine, which method comprises the steps of;

providing a ground support system according to any of the preceding claims, letting the intermittent combustion engine run at the predetermined engine rotational speed, connecting the electrical cable of the ground support system to the aircraft, connecting the air duct of the ground support system to the aircraft, using the control unit to adjust an air flow rate of the pressurised air supplied by the air pump by adjusting the transmission.

In an embodiment of the method according to the invention, the method comprises adjusting the air flow rate of the pressurised air supplied by the air pump by continuously varying the transmission with the control unit.

In an embodiment of the method according to the invention, the method comprises;

using the control unit to set the air pump in a first operation mode in which the pressurised air is supplied with an air flow rate to support the aircraft during testing, testing the aircraft with the pressurised air supplied via the air duct, using the control unit to set the air pump in a second operation mode in which the pressurised air is supplied with an air flow rate to perform an air-start of the turbine engine, performing an air-start of the turbine engine with the pressurised air supplied via the air duct.

In an embodiment of the method according to the invention, in the first operation mode, the air flow rate of the pressurised air is lower than 8 m³/min, while a maximum producible air overpressure of the pressurised air is lower than 2.1 bar, or equal to 2.1 bar, and in the second operation mode, the air flow rate of the pressurised air is between 13-23 m³/min, while a maximum producible air overpressure of the pressurised air is between 2.2-3.5 bar.

In an embodiment of the method according to the invention, independent of the adjustments of the air flow rate of the pressurised air supplied by the air pump, the generator supplies electrical power with a constant frequency due to the combustion engine running at the predetermined engine rotational speed.

It will be clear that the method according to the invention can comprise the features of any combination of the above mentioned embodiments of the method.

BRIEF DESCRIPTION OF THE DRAWINGS

Embodiments of the ground support system will be described by way of example only, with reference to the accompanying schematic drawings in which corresponding reference symbols indicate corresponding parts, and in which.

DETAILED DESCRIPTION OF THE DRAWINGS

Figure 1:
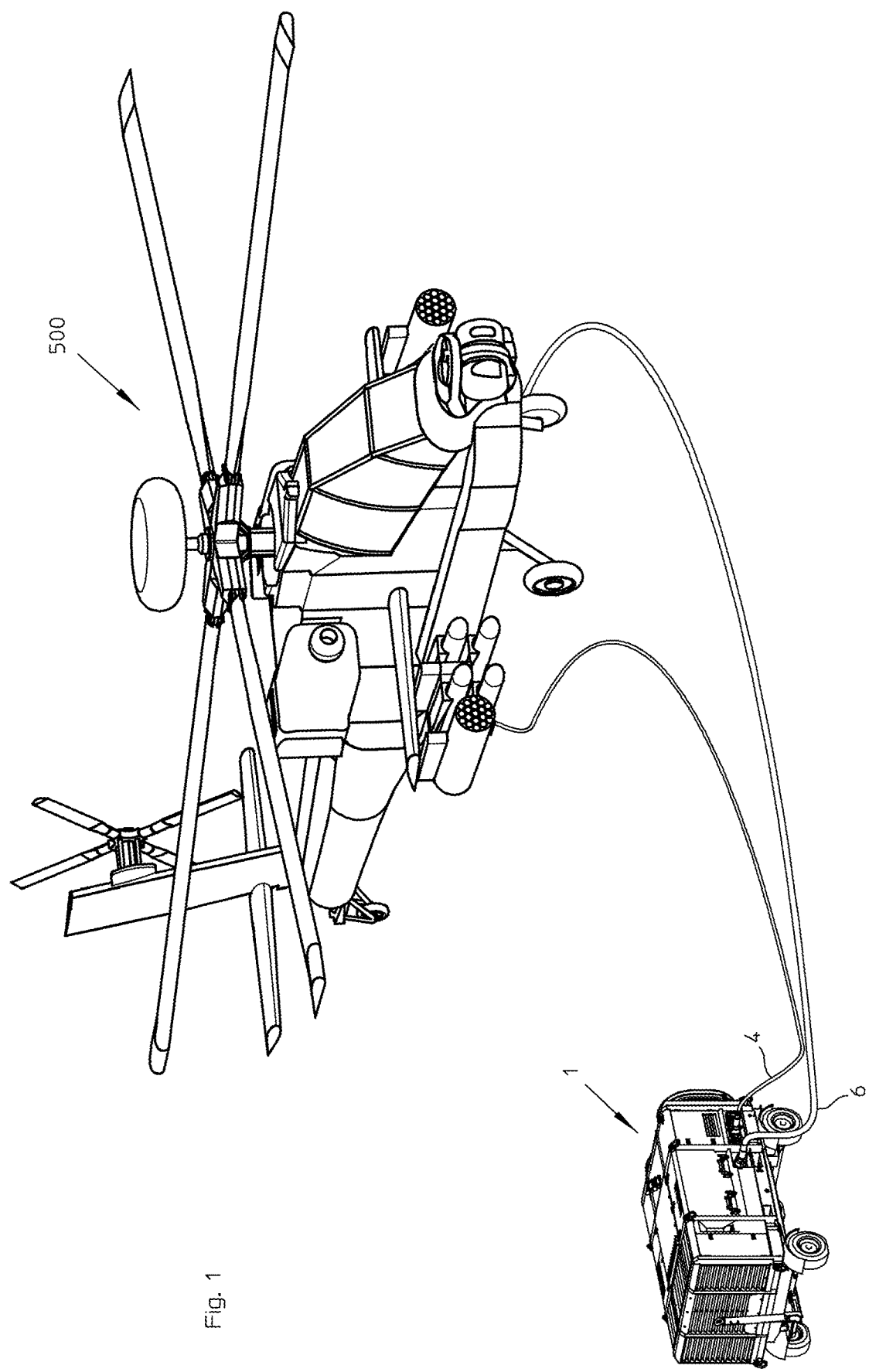
FIG. 1 schematically shows a view in perspective of an embodiment of the ground support system according to the invention, and FIG. 2 schematically shows the inside of the ground support system of FIG. 1.
Figure 2:
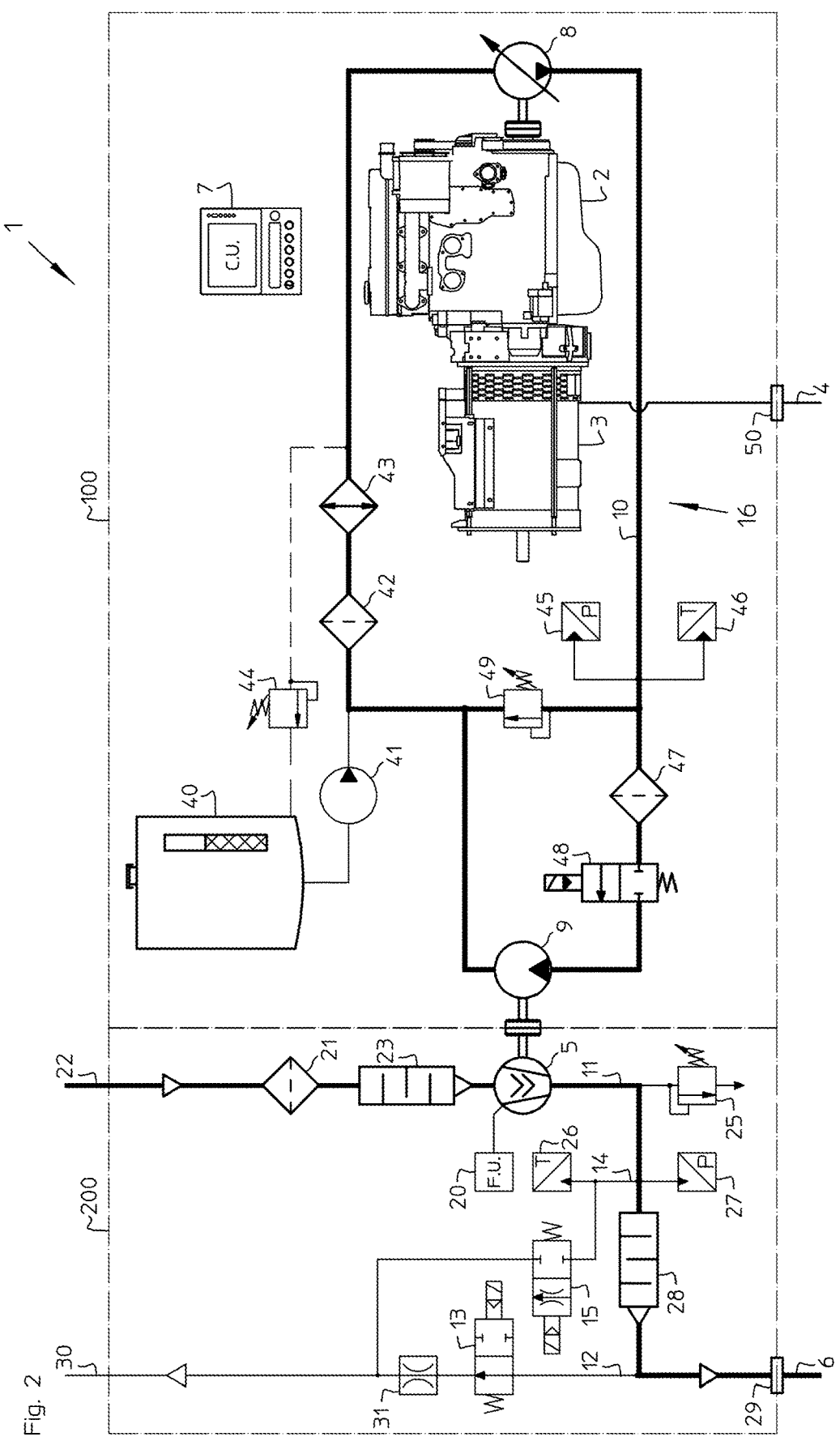

FIG. 1 shows schematically a view in perspective of an embodiment of the ground support system 1 according to the invention, and FIG. 2 shows schematically the inside of the ground support system 1 of FIG. 1.

The ground support system 1 is suitable for use on an aircraft 500 having a turbine engine. The ground support system 1 comprises an intermittent combustion engine 2, a generator 3 which is driven by the combustion engine 2 to supply electrical power with a constant frequency, an electricity cable 4 to transport the electrical power to the aircraft 500, an air pump 5 which is driven by the combustion engine 2 to supply pressurised air, and an air duct 6 to transport the pressurised air to the aircraft 500. A control unit 7 is provided to control the operation of the ground support system 1. The control unit 7 communicates with the combustion engine 2 to let the combustion engine 2 run at a predetermined engine rotational speed. The air pump 5 is driven by the combustion engine 2 via an adjustable transmission 16 to adjust an air flow rate of the pressurised air supplied by the air pump 5, while the combustion engine 2 remains running at the predetermined engine rotational speed. Hence, the combustion engine 2 continuously runs at the predetermined engine rotational speed, so that the electrical power supplied by the generator 3 has a constant frequency.

The adjustable transmission 16 is continuously variable. This means that the transmission 16 is not adjustable in steps, but can be adjusted continuously.

The air pump 5 and transmission 16 are configured to adjust the air flow rate of the pressurised air over a range of 0-13 m$^3$/min, preferably 0-23 m$^3$/min, while an maximum producible air overpressure of the pressurised air is at least 2.2 bar, preferably at least 3 bar. In use, the air flow rate is set with the control unit 7. The air overpressure that is reached, depends on the resistance of the part of the aircraft 500 through which the pressurised air will flow. If the resistance is low, a relatively low air overpressure will be reached. If the resistance is high, a relatively high air overpressure will be reached. The maximum producible air overpressure indicates the highest air overpressure that the air pump 5 can produce. The in this document indicated air flow rates are determined at a temperature of around 20° C.

The control unit 7 is configured to switch the transmission 16 from a first operation mode, in which the pressurised air is supplied with a first air flow rate, into a second operation mode, in which the pressurised air is supplied with a second air flow rate, and vice versa. The second air flow rate is higher than the first air flow rate. The first flow rate is set to support the aircraft 500, and the second flow rate is set to perform an air-start of the turbine engine.

In the first operation mode, the air flow rate of the pressurised air is around 6 m$^3$/min, while a maximum producible air overpressure of the pressurised air is around 2 bar, and in the second operation mode, the air flow rate of the pressurised air is around 19 m$^3$/min, while a maximum producible air overpressure of the pressurised air of around 3 bar.

In other embodiments of the ground support system 1, the air flow rate of the pressurised air in the first operation mode is lower than 8 m$^3$/min, while a maximum producible air overpressure of the pressurised air lower than 2.1 bar, or equal to 2.1 bar, and in the second operation mode, the air flow rate of the pressurised air is between 13-23 m$^3$/min, while a maximum producible air overpressure of the pressurised air of between 2.2-3.5 bar.

As shown in FIG. 2, the adjustable transmission 16 comprises a liquid pump 8 which is operatively coupled to the combustion engine 2 and a hydraulic driver 9 which is operatively coupled to the air pump 5. The liquid pump 8 is hydraulically connected to the hydraulic driver 9 via a liquid channel 10 to drive the hydraulic driver 9. The control unit 7 communicates with the liquid pump 8 to adjust a liquid flow rate of the liquid pumped by the liquid pump 8 in order to adjust a driving rotational speed with which the hydraulic driver 9 drives the air pump 5. Due to the fact that the liquid pump 8 is driven by the combustion engine 2 which runs at a predetermined engine rotational speed, the liquid pump 8 also runs continuously at a specific speed. The liquid flow rate of the liquid pump 8 is adjusted by adjusting the piston stroke. It will be clear that other ways of adjusting the liquid flow rate are possible.

The air pump 5 is pneumatically connected to the air duct 6 via an air channel 11, and a flow rate unit 20 is connected to the air pump 5 to determine the air flow rate of pressurised air through the air channel 11. The flow rate unit 20 determines a pneumatic rotational speed at which the air pump 5 operates. The air rate is subsequently determined on basis of the pneumatic rotational speed of the air pump 5. In other embodiments of the ground support system 1, the flow rate unit 20 is connected to the air channel 11 to determine the air flow rate of pressurised air through the air channel 11. In said situation, the air flow rate can directly be measured in the air channel 11.

A first discharge channel 14 is pneumatically connected to the air channel 11. A first controllable air valve 15 is provided in the first discharge channel 14. The control unit 7 communicates with the flow rate unit 20 and the first controllable air valve 15 to open the first controllable air valve 15 when the air flow rate of pressurised air through the air channel 11 is lower than a predetermined air flow rate. If the air flow rate is too low, the temperature of the air will rise. In order to avoid that the air pump 5 will be over heated, the first controllable air valve 15 will be opened. This way, pressurised air will be discharged, so that 35 the air flow rate will rise until the predetermined air flow rate is reached. The control unit 7 opens the first controllable air valve 15 when the air flow rate is lower than 2 m$^3$/min. It is also possible that the control unit 7 opens the first controllable air valve 15 when the pneumatic rotational speed of the air pump 5 is lower than 2000 rounds per minute.

An air pressure sensor 27 is connected to the air channel 11. In other embodiments, the air pressure sensor 27 is connected to the air pump 5. A second discharge channel 12 is pneumatically connected to the air channel 11. A second controllable air valve 13 is provided in the second discharge channel 12. The control unit 7 communicates with the air pressure sensor 27 and the second controllable air valve 13 to open the second controllable air valve 13 when the air overpressure of pressurised air through the air channel 11 increases more than a predetermined amount of bar/sec. The control unit 7 opens the second controllable air valve 13 when the air overpressure increases more than 1 bar/sec.

In other embodiments of the ground support system 1, the first controllable air valve 15 and the second controllable air valve 13 are combined in a single controllable air valve, and the first discharge channel 14 and the second discharge channel 12 are combined in a single discharge channel.

FIG. 2 shows that the ground support system 1 has a hydraulic part 100 and a pneumatic part 200. The hydraulic part 100 has a main hydraulic circuit formed by the liquid channel 10, and in which the liquid flows from the liquid pump 8 via a liquid pressure sensor 45, a liquid temperature sensor 46, a high pressure liquid filter 47 and a controllable liquid valve 48 to the hydraulic driver 9. From the hydraulic driver 9, the liquid flows back to the liquid pump 8 via a low pressure liquid filter 42 and a liquid cooler 43. The controllable liquid valve 48 can be controlled via the control unit 7. The controllable liquid valve 48 is a two-way valve, which can be placed in an open position and a closed position. When the controllable liquid valve 48 is in the closed position, a bypass circuit can be formed wherein the liquid flows from the liquid pump 8 via the liquid pressure sensor 45, the liquid temperature sensor 25 46, a liquid safety valve 49, the low pressure liquid filter 42 and the liquid cooler 43, back to the liquid pump 8. The liquid safety valve 49 is an automatic valve which automatically closes when the pressure in the liquid channel 10 is lower than a predetermined liquid pressure and opens when said pressure is higher than or equal to the predetermined liquid pressure. When the controllable liquid valve 48 is closed, the pressure in the liquid channel 10 can increase. When said pressure reaches the predetermined liquid pressure, the liquid safety valve 49 will open and the liquid will flow along the bypass circuit.

The section from the liquid pump 8 until the liquid safety valve 49 and the hydraulic driver 9 (when seen in the flow direction of the liquid), forms the high pressure section of the hydraulic part 100. The remaining part forms the low pressure section of the hydraulic part 100. The liquid safety valve 49 ensures that the pressure in the high pressure section does not exceed the predetermined liquid pressure. A further liquid safety valve 44 is connected to the low pressure section of the hydraulic part 100. The further liquid safety valve 49 opens automatically when the pressure in said low pressure section exceeds or is equal to a further predetermined liquid pressure. In said situation, the liquid is discharged in a liquid reservoir 40. The liquid reservoir 40 is furthermore connected to the liquid channel 10 via a further pump 41. This allows it to add liquid to the hydraulic part 100 when needed. It is possible to creating a circulating flow of liquid along the liquid cooler 43 and the liquid reservoir 40, to cool the liquid. The further pump 41 is also be used to create a baseline pressure in the low pressure section the hydraulic part 100. The further pump 41 can be driven by the combustion engine 2.

In the pneumatic section, air enters the air channel 11 via an air inlet 22 and flows subsequently via an air filter 21 and a first damper 23 to the air pump 5. The flow rate unit 20 is connected to the air pump 5. The air flows from the air pump 5 via an air temperature sensor 26, an air pressure sensor 27, and a second damper 28 to an air duct 6 connector for connecting the air duct 6. An air safety valve 25 is connected to the air channel 11 downstream of the air pump 5. The air safety valve 25 opens automatically when the pressure in the air channel 11 exceeds or is equal to a predetermined air pressure. The first controllable air valve 15 and second controllable air valve 13 are connected to the air channel 11 downstream of the air pump 5. Both controllable air valves are connected to a discharge outlet 30. An air reducer 31 is located downstream of the first controllable air valve 15.

In FIG. 2, the air flow rate of the air pump 5 is controlled by controlling the flow rate of the flow rate of the liquid pumped by the liquid pump 8. It will be clear for the skilled person that this air flow rate can also be controlled in a different manner.

The control unit 7 communicates with many different parts of the ground support system 1. This means that the control unit 7 has a communication line with said parts of the ground support system 1. This can be via communication wires or via a wireless connection. For clarity reasons, the communication lines between the control unit 7 and said parts of the ground support system 1 are not shown. It will be clear that in FIG. 2, the control unit 7 has communication lines with at least, the combustion engine 2, the liquid pump 8, the controllable liquid valve 48, the further liquid pump 41, the flow rate unit 20, the first controllable valve 13 and the second controllable valve 15.

The generator 3 is connected to an electrical cable connector 50 to which the electrical cable 4 can be connected. The generator 3 also provides energy to several parts of the ground support system 1, such as the control unit 7, the safety valves 25, 44, 49, and the controllable valves 13, 15, 48. This means that the generator 3 is electrically connected to said parts of the ground support system 1. For clarity reasons, the electricity lines between the generator 3 and said parts of the ground support system 1 are not shown.

The ground support system 1 according to the invention allows a method for supporting an aircraft 500 with a turbine engine. The method comprises the steps of;
providing the ground support system 1,
letting the intermittent combustion engine 2 run at the predetermined engine rotational speed,
connecting the electrical cable of the ground support system 1 to the aircraft 500,
connecting the air duct 6 of the ground support system 1 to the aircraft 500, and
using the control unit 7 to adjust an air flow rate of the pressurised air supplied by the air pump 5 by adjusting the transmission 16.

The air flow rate of the pressurised air supplied by the air pump 5 is adjusted by continuously varying the transmission 16 with the control unit 7.

The following steps are preformed; using the control unit 7 to set the air pump 5 in a first operation mode in which the pressurised air is supplied with an air flow rate to support the aircraft 500 during testing,
testing the aircraft 500 with pressurised air supplied via the air duct 6,
using the control unit 7 to set the air pump 5 in a second operation mode in which the pressurised air is supplied with an air flow rate to perform an air-start of the turbine engine,
performing an air-start of the turbine engine with the pressurised air supplied via the air duct 6.

In the first operation mode, the air flow rate of the pressurised air is lower than 8 m$^3$/min, while a maximum producible air overpressure of the pressurised air is lower than 2.1 bar, or equal to 2.1 bar, and in the second operation mode, the air flow rate of the pressurised air is between 13-23 m$^3$/min, while a maximum producible air overpressure of the pressurised air is between 2.2-3.5 bar.

Independent of the adjustments of the air flow rate of the pressurised air supplied by the air pump 5, the generator 3 supplies electrical power with a constant frequency due to the combustion engine 2 running at the predetermined engine rotational speed. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

It will be apparent to those skilled in the art that various modifications can be made to the device and method without departing from the scope as defined in the claims.

The invention claimed is:

1. Ground support system for an aircraft having a turbine engine, which ground support system comprises;
   an intermittent combustion engine,
   a generator which is driven by the combustion engine to supply electrical power with a constant frequency,
   an electricity cable to transport the electrical power to the aircraft,
   an air pump which is driven by the combustion engine to supply pressurised air,
   an air duct to transport the pressurised air to the aircraft,
   a controller to control operation of the ground support system, which controller communicates with the combustion engine to let the combustion engine run at a predetermined engine rotational speed, and wherein
   the air pump is driven by the combustion engine via an adjustable transmission to adjust an air flow rate of the pressurised air supplied by the air pump, while the combustion engine remains running at the predetermined engine rotational speed, and wherein;
   the adjustable transmission comprises a liquid pump which is operatively coupled to the combustion engine and a hydraulic driver which is operatively coupled to the air pump,
   the liquid pump is hydraulically connected to the hydraulic driver via a liquid channel to drive the hydraulic driver, and
   the controller communicates with the liquid pump to adjust a liquid flow rate of the liquid pumped by the liquid pump in order to adjust a driving rotational speed with which the hydraulic driver drives the air pump.

2. Ground support system for an aircraft having a turbine engine, which ground support system comprises;
   an intermittent combustion engine,
   a generator which is driven by the combustion engine to supply electrical power with a constant frequency, the generator requiring a constant rotational speed of the combustion engine in order for the generator to supply the electrical power with the constant frequency,
   an electricity cable to transport the electrical power to the aircraft,
   an air pump which is driven by the combustion engine to supply pressurised air,
   an air duct to transport the pressurised air to the aircraft,
   a controller to control operation of the ground support system, which controller communicates with the combustion engine to let the combustion engine remain running at a constant predetermined engine rotational speed throughout supplying of the electrical power to the aircraft, and wherein
   the air pump is driven by the combustion engine via an adjustable transmission to adjust an air flow rate of the pressurised air supplied by the air pump, while the combustion engine remains running at the constant predetermined engine rotational speed throughout supplying of the electrical power to the aircraft, the constant predetermined rotational speed of the combustion engine thereby enabling the constant frequency of the electrical power supplied by the generator, and
   wherein the controller is programmed to adjust the adjustable transmission to thereby adjust the air flow rate while the controller communicates with the combustion engine to cause the combustion engine to remain running at the constant predetermined engine rotational speed throughout supplying of the electrical power to the aircraft.

3. Ground support system according to claim 2, wherein the adjustable transmission is continuously variable.

4. Ground support system according to claim 2, wherein the air pump and transmission are configured to adjust the air flow rate of the pressurised air over a range of 0-23 m3/min, while a maximum producible air overpressure of the pressurised air is between 2.2 bar-3.5 bar.

5. Ground support system according to claim 2, wherein the controller is configured to switch the air pump from a first operation mode, in which the pressurised air is supplied with a first air flow rate, into a second operation mode, in which the pressurised air is supplied with a second air flow rate, and vice versa, and wherein the second air flow rate is higher than the first air flow rate.

6. Ground support system according to claim 5, wherein the first flow rate is set to support the aircraft during testing, and the second flow rate is set to perform an air-start of the turbine engine.

7. Ground support system according to claim 5, wherein in the first operation mode, the air flow rate of the pressurised air is lower than 8 m3/min, while a maximum producible air overpressure of the pressurised air is lower than 2.1 bar, or equal to 2.1 bar, and in the second operation mode, the air flow rate of the pressurised air is between 13-23 m3/min, while a maximum producible air overpressure of the pressurised air is between 2.2-3.5 bar.

8. Ground support system according to claim 2, wherein;
   the air pump is pneumatically connected to the air duct via an air channel, and
   a flow rate detector is connected to the air pump or the air channel to determine the air flow rate of pressurised air through the air channel.

9. Ground support system according to claim 8, wherein the flow rate detector is connected to the air pump and determines a pneumatic rotational speed at which the air pump operates.

10. Ground support system according to claim 8, wherein;
    a first discharge channel is pneumatically connected to the air channel,
    a first controllable air valve is provided in the first discharge channel, and
    the controller communicates with the flow rate detector and the first controllable air valve to open the first controllable air valve when the air flow rate of pressurised air through the air channel is lower than a predetermined air flow rate.

11. Ground support system according to claim 2, wherein the controller opens a second controllable air valve when the air flow rate is lower than 2 m3/min.

12. Ground support system according to claim 2 wherein an air pressure sensor is connected to the air pump or the air channel.

13. Ground support system according to claim 12, wherein;
a second discharge channel is pneumatically connected to the air channel,
a second controllable air valve is provided in the second discharge channel, and
the controller communicates with the air pressure sensor and the second controllable air valve to open the second controllable air valve when air overpressure of the pressurised air in the air channel increases more than a predetermined amount.

14. Ground support system according to claim 13, wherein the controller opens the second controllable air valve when the air overpressure increases more than 1 bar/sec.

15. Ground support system according to claim 10, wherein;
the first controllable air valve and a second controllable air valve are combined in a single controllable air valve, and
the first discharge channel and a second discharge channel are combined in a single discharge channel.

16. Ground support system according to claim 2, wherein the generator supplies electrical power with a constant frequency due to the combustion engine running at the predetermined engine rotational speed.

17. Method for supporting an aircraft with a turbine engine, which method comprises the steps of;
providing a ground support system according to claim 2,
letting the intermittent combustion engine run at the predetermined engine rotational speed,
connecting the electrical cable of the ground support system to the aircraft,
connecting the air duct of the ground support system to the aircraft, and
using the controller to adjust the air flow rate of the pressurised air supplied by the air pump by adjusting the transmission.

18. Method according to claim 17, wherein the method comprises adjusting the air flow rate of the pressurised air supplied by the air pump by continuously varying the transmission with the controller.

19. Method according to claim 17, wherein the method comprises;
using the controller to set the air pump in a first operation mode in which the pressurised air is supplied with an air flow rate to support the aircraft during testing,
testing the aircraft with the pressurised air supplied via the air duct,
using the controller to set the air pump in a second operation mode in which the pressurised air is supplied with an air flow rate to perform an air-start of the turbine engine, and
performing an air-start of the turbine engine with the pressurised air supplied via the air duct.

20. Method according to claim 19, wherein in the first operation mode, the air flow rate of the pressurised air is lower than 8 m3/min, while a maximum producible air overpressure of the pressurised air is lower than 2.1 bar, or equal to 2.1 bar, and in the second operation mode, the air flow rate of the pressurised air is between 13-23 m3/min, while a maximum producible air overpressure of the pressurised air is between 2.2-3.5 bar.

* * * * *